Sept. 9, 1969  TOSHIO KASHIWASE  3,465,662
ZOOM LENS BARREL FOR CAMERAS
Filed Sept. 2, 1966  2 Sheets-Sheet 1

United States Patent Office 3,465,662
Patented Sept. 9, 1969

3,465,662
ZOOM LENS BARREL FOR CAMERAS
Toshio Kashiwase, Zushi-shi, Japan, assignor to Nippon Kogaku K.K., Tokyo, Japan, a corporation of Japan
Filed Sept. 2, 1966, Ser. No. 576,970
Claims priority, application Japan, Sept. 3, 1965, 40/72,290
Int. Cl. G03b 3/02
U.S. Cl. 95—45                              4 Claims

ABSTRACT OF THE DISCLOSURE

A zoom lens for use in a single lens reflex camera wherein the focussing operation and the focal length varying operation are selectively performed through the use of a single operating ring. The ring is slidable along the optical axis of the lens into one of two positions which determine the parameters to be adjusted. With the ring in its forwardmost position it can be rotated to control the focussing of the lens. When the ring is in its rearwardmost position it can be rotated to change the focal length of the lens. Both settings can be accomplished without the operator moving his hand from one control element to another.

---

This invention relates to a zooming lens barrel and more particularly to a zooming lens barrel for single lens reflex cameras.

Recently, a zooming lens having a larger zooming ratio has been developed, and it becomes necessary, in the zooming lens of mechanical correction type, to enlarge the velocity difference of the correction lens relative to the moving lens of the magnification optical system. In the conventional zooming lenses of this type the magnification and the focussing of the lenses are carried out by rotating an operating ring provided for each function, thereby necessitating a shifting from the use of one ring to the other ring. In the case of a zooming lens having a large zooming range, it becomes very troublesome to shift from one operating ring to another when exposures are being made, all the more so when the camera is handheld due to the form and weight of the camera and its large extending lens.

It is therefore the object of the present invention to provide a zoom lens for a single lens reflex camera wherein the zooming and focussing operations are performed by the rotation of one operating ring.

In accordance with the present invention a zoom lens barrel is provided having a member for longitudinally moving a plurality of lenses for vari-magnification and a rotatable member for longitudinally moving a focussing lens, each member being formed with a clutch face for connecting selectively to an operating ring rotatably mounted on the lens barrel, the operating ring being axially moveable and provided with clutch faces for engagement with the clutch faces of the members to rotate the same upon rotation of the ring and to cause axial movement thereof.

The present invention will be better understood by the following description in conjunction with an illustrative embodiment of the present invention shown in the accompanying drawing, in which.

Figure 3:
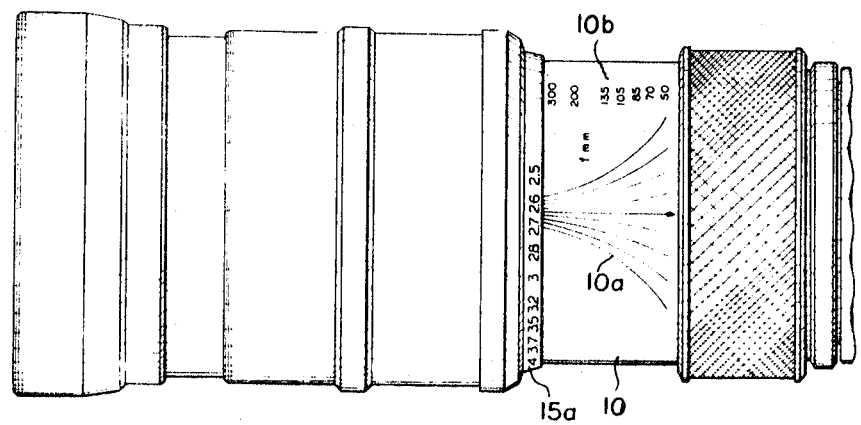
FIG. 3 shows the outlook of the barrel of FIG. 1.

Referring now to the drawings, the optical system of a zooming lens is illustrated having lenses $L_1$, $L_2$, and $L_3$. A fixed barrel 1 is provided with a longitudinal straight guide groove 1a and passage grooves 1b, the grooves being arranged so that there is no interference with a support frame 5 provided for the lens $L_3$, as hereinafter more fully described. Threaded or otherwise secured to the fixed barrel 1 is a cam ring 2 provided with a helical groove 2a and a cam groove 2b (FIG. 2). The ring 2 is further provided with a row of projections or a rack 2c on one exposed edge thereof for the purposes hereinafter appearing. Fitted within the cam ring 2 is a helicoid barrel 3 having a helicoid on its outer periphery at the left hand end thereof and formed with passage grooves 3a at the right hand end thereof. For purposes hereinafter appearing a pin 4 is secured in the helicoid barrel 3, the pin 4 being adapted to register in the helical groove 2a (FIG. 2) of the cam ring 2. The frame 5 previously mentioned, supports the rear lens $L_3$ of the zoom lens system and is formed with lugs, only one being illustrated in FIG. 1, whereby the frame is secured to the helicoid barrel 3, the lugs fitting within the passage grooves 1b provided in the fixed barrel. A barrel 6 for supporting the second group of lenses is movably fixed on the said fixed barrel 1, and is engaged with the above mentioned straight groove 1a and the cam groove 2b simultaneously through a pin 7 being inserted through the passage groove 3a and fixed on the cylindrical portion thereof. Element 8 is a member fixed onto the fixed barrel 1, and three passage grooves 8a are formed thereon so as not to interfere with the said helicoid barrel 3. Element 9 is a connection pin fixed on the member 8, 10 is an indicator cylinder which is unitedly connected to the fixed barrel through the pin 9, and on the surface thereof, the focal depth graduation 10a and the focal distance graduation 10b are provided as shown in FIG. 3. A focussing cylinder 11 is secured to the member 8 by means of screw threads or the like, and is formed at its right hand end with a clutch face or rack 11a and with a groove 11b at about its median portion to accommodate the connecting pin 9. Element 12 is a pin fixed on the said cylinder 11, and 13 is a member fixed onto the said helicoid barrel 3 and on the periphery thereof the window portion 13a which does not interfere with the rotation or movement of the said pin 12, is provided. Element 14 is the focusing barrel which supports the first group of lenses $L_1$ and is threaded on the helicoid barrel 3 so as to be moved back and forth in the axial direction. Two longitudinal key grooves 14a and 14b are formed in the focussing barrel 14 in which grooves the pin 9 and a pin 16 register, the pin being secured in element 15. Element 15 is the outer cylinder having the distance graduation 15a on one end thereof and is devised so as to be moved along with the focusing barrel 14 through the projected screw 16. Element 17 is the operation ring rotatably and slidably mounted on the outer periphery of the fixed barrel 1. The left hand end of the operating ring 17 is formed with a radially inward projection which is provided on opposite sides with racks 17a and 17b adapted to mesh with the racks 2c and 11a, respectively, formed on the cam ring 2 and on the focussing cylinder 11.

Figure 1:
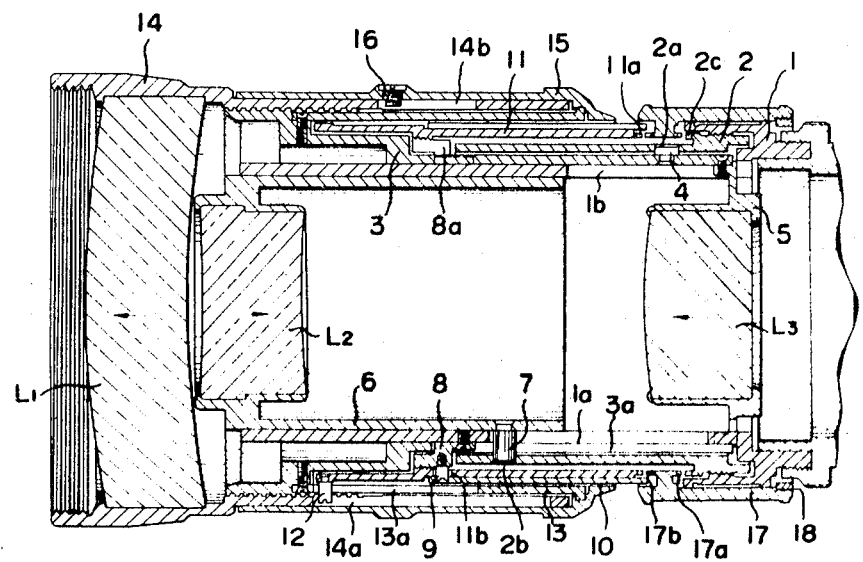
FIG. 1 is a cross sectional view of an illustrative embodiment of the present invention.
Figure 2:
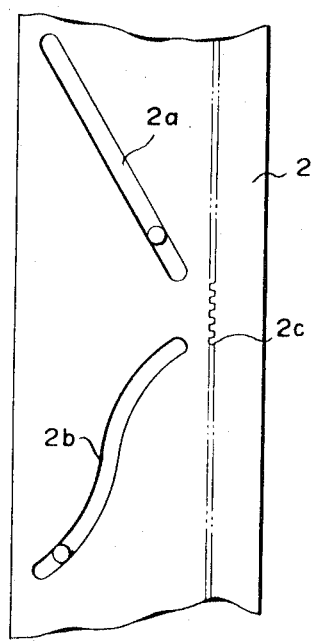
FIG. 2 is a development diagram showing the cam ring for magnification of FIG. 1.

With the foregoing description of the arrangement of elements, it will be apparent that when the operating ring 17 is pulled, or moved to the right in FIG. 1, and then rotated the zooming operation is performed. When the ring 17 is pushed, or moved to the left, and then rotated, the focusing operation is performed. In other words, when the operation ring 17 is pulled, one of the projection 17a for clutch and the projection 2c for clutch and the projection 2c for clutch of the cam ring 2 for magnification are in mesh with each other, and when the operation ring 17 is rotated, the helicoid barrel 3 is moved forward through the straight cam 2a and the pin 4, and simultaneously the cylinder 6 for supporting the second group lenses moves by a predetermined degree to perform the zooming operation through the cam groove 2b and the pin 7. Next, when the operation ring 17 is pushed forward, the other projection 17b and the projection 11a of the joint cylinder 11 are in mesh with each other, and they are rotated together, and therefore the focusing cylinder is rotated through the pin 12 and the key groove 14a, and is moved back and forth in the axial direction by means of helicoid mechanism to carry out focusing. The focal distance which is changed along with the zooming operation is read by the focal distance graduation 10b on the indicator cylinder 10 which indicates the focal distance on the end of the outer cylinder 15, and the focal depth which is changed by the focusing is read by the focal depth graduation 10a relative to the distance graduation 15a.

There is thus provided a zoom lens wherein the zooming and focussing operations are selectively performed by one operating ring whereby the adjustments are readily made without the need for fumbling from one ring to another, and in which fine adjustments may be made with certainty and accuracy through the use of separate and independent threaded connections and cam slots so that an adjustment once made will not be accidently changed, a change in magnification or focus being made only upon the meshing of the operating ring and its subsequent rotation.

What is claimed is:

1. A zoom lens barrel for a camera, comprising in combination
   a fixed barrel mounted on the camera,
   a projection on the outer surface of the barrel,
   a cam ring for zoom effect rotatably mounted on the fixed barrel,
   at least one groove in said cam ring,
   means for mounting a plurality of lenses,
   at least one pin extending radially from said means and registering in the cam ring groove to move said means axially within the fixed barrel upon rotation of the cam ring,
   a cylinder for focussing rotatably mounted on the fixed barrel,
   a focussing barrel supporting the first lens of the objective,
   means for moving the focussing barrel axially upon rotation of the cylinder,
   an operating ring rotatably mounted on the fixed barrel and axially movable between two extreme positions, and
   clutch means for connecting the operating ring in one extreme position with the cam ring and with the focussing cylinder in its other extreme position for rotating the cam ring and focussing cylinder.

2. A zoom lens barrel according to claim 1, wherein the clutch means includes a first rack formed on the cam ring,
   a second rack formed on the cylinder, and
   separate racks on the operating ring, each operating ring rack meshing respectively with the rack on the cam ring and the cylinder dependent upon the extreme position of the operating ring.

3. A zoom lens barrel according to claim 1, wherein the cam ring is formed with a helical cam groove and a correction cam groove, the pin of the lens mounting means registering in the correction cam groove,
   a helicoid barrel rotatably and slidably mounted on the fixed barrel,
   a second pin extending radially from the helicoid barrel and registering in the helical cam groove, and
   a frame secured to the helicoid barrel and supporting the rear lens of the objective, the rotation of the cam ring moving the helicoid barrel axially.

4. A zoom lens barrel according to claim 3, wherein an indicator cylinder is secured to the fixed barrel,
   indicia thereon indicating focal depth and focal distance,
   a second indicator cylinder movable and rotatable with the focussing barrel, and
   distance graduations on the second cylinder cooperating with the focal depth indicia, the edge of the second cylinder cooperating with the focal distance indicia.

References Cited

UNITED STATES PATENTS

| | | | |
|---|---|---|---|
| 2,984,154 | 6/1961 | Walker | 95—45 |
| 3,059,533 | 10/1962 | Mellberg | 95—45 |
| 3,158,076 | 11/1964 | Back et al. | 95—45 |
| 3,277,783 | 10/1966 | Eggert | 350—187 |
| 3,370,907 | 2/1968 | Cox et al. | 352—140 |

NORTON ANSHER, Primary Examiner

RICHARD L. MOSES, Assistant Examiner

U.S. Cl. X.R.

350—187; 352—140